CONTACTING ARRANGEMENT FOR SOLID-STATE COMPONENTS

Filed July 7, 1966 2 Sheets-Sheet 1

INVENTORS
Klaus Hennings &
Hans-Jürgen Schütze
BY Spencer & Kaye
ATTORNEYS

CONTACTING ARRANGEMENT FOR SOLID-STATE COMPONENTS

INVENTORS
Klaus Hennings &
Hans-Jürgen Schütze

BY Spencer & Kaye
ATTORNEYS

United States Patent Office 3,456,335
Patented July 22, 1969

3,456,335
CONTACTING ARRANGEMENT FOR SOLID-STATE COMPONENTS

Klaus Hennings and Hans-Jurgen Schutze, Ulm (Danube), Germany, assignors to Telefunken Patentverwertungsgesellschaft m.b.H., Ulm (Danube), Germany Filed July 7, 1966, Ser. No. 563,596
Claims priority, application Germany, July 17, 1965, T 29,011
Int. Cl. B01j *17/00;* H01l *1/00*
U.S. Cl. 29—579 18 Claims

ABSTRACT OF THE DISCLOSURE

A method for providing contacts to semiconductor elements in which the semiconductor elements are separated and are then placed onto an insulated plate of a housing. The plate is provided with conducting paths and connections. The semiconductor element when placed onto the insulated plate has the conductive paths and connections properly arranged to provide connections to the elements of the semiconductor device. The device is applied directly to the insulated plates so that the connections are all formed in a simple and reliable manner.

The present invention relates generally to the semiconductor field, and, more particularly, to the contacting of structural semiconductor components and solid-state circuits.

In the semiconductor field the contacting of a semiconductor component or solid-state circuit is generally effected by using thermcompression or microwelding techniques. In accordance with these processes a very thin wire, for example, gold or aluminum, is connected to a contact which has been alloyed into the semiconductor material, or to a conductive contacting path which has been vacuum deposited onto the passivation layer of the semiconductor body, and this wire is connected to the contact pin or to the circuit. In order to install the wires very complicated and therefore expensive machinery is required. Furthermore, each structural element must be contacted individually under a microscope. The contacting operation is therefore one of the most expensive working steps during the manufacture of the structural element or the solid-state circuit.

Several methods for simplifying the contacting operation have recently become known in the art. According to the "flip-chip technique" metallic pellets may be disposed on the semiconductor contacts or on the contact paths on the passivation layer and may also be embedded into an insulating layer if desired. The elements with these metallic pellets are thereafter mounted onto corresponding connections of a thin film circuit, for example onto conducting paths which are formed according to the silk screening or vacuum or vapor deposition techniques on insulating carriers.

It has also been previously proposed to have the structural elements with their vacuum deposited contacts soldered directly onto the conducting paths of the carrier plate, or, prior thereto, to additionally galvanically reinforce the vacuum deposited contacts. It has furthermore been proposed to remove a part of the semiconductor body after the galvanic reinforcement of the vacuum deposited contacts so that the reinforced vacuum deposited contacts will project as wires beyond the semiconductor body ("beam lead technique") and to connect the same to the contact or the circuit by thermocompression.

However, except for the last-mentioned method all of the previous methods have the disadvantage that the contacts are not very reliable because they are subjected to mechanical stresses which may, for example, be due to inadequately arranged materials with regard to their expansion coefficients. As a result, contact resistances are produced and in the event that the mechanical stresses are effective in the active semiconductor zones, the electrical characteristics are also changed. In addition, the heat dissipation of the structural elements or the solid-state circuits is limited in all of the above-mentioned methods since it is provided either only by the contacts or by the binding agent which is used for mechanical attachment.

With this in mind it is a main object of the present invention to avoid the disadvantages of the prior art.

Another object of the invention is to provide an arrangement for contacting semiconductor elements and solid-state circuits in which there is a high degree of reliability of the contacts so produced and a good heat dissipation of the semiconductor elements and solid-state circuits.

These objects and others ancillary thereto are accomplished in accordance with preferred embodiments of the invention wherein a semiconductor body is provided with an insulating layer coating. Subsequently the body is provided with semiconductor elements and separate, preferably low resistivity zones which extend from the upper surface to the lower surface of the semiconductor body. Then, the semiconductor elements and the separated and preferably low resistance zones are provided with non-rectifying contacts and conducting paths are applied onto the insulating layer. These paths mutually interconnect the contacts of the semiconductor elements and those of the separated low resistivity zones. Finally, the semiconductor arrangement is soldered onto the insulating plate of a housing and which is provided with conducting paths and connections. This is performed in such a manner that the separated low resistivity zones and the semiconductor elements are provided with a conductive connection with the conducting paths and the connections of the insulating plate.

The present invention has the considerable advantage that during the soldering of the semiconductor body, which is provided with the semiconductor elements, onto the insulating plate, there is provided a contacting of the semiconductor elements or the entire solid-state circuit, as the case may be, and this is performed automatically by virtue of the continuous conductive and separated zones within the semiconductor body.

Additional objects and advantages of the present invention will become apparent upon consideration of the following description when taken in conjunction with the accompanying drawings in which:

FIGURE 1*a* is a schematic sectional view of the semiconductor body provided with one insulating layer and after the body has been selectively etched.

FIGURE 1*b* is a view similar to FIGURE 1*a* showing the device after a semiconductor layer is applied.

FIGURE 1*c* is a view similar to FIGURE 1*b* showing the device after contacting between the low resistivity semiconductor zones and the semiconductor elements.

FIGURE 1*d* is a plan view of the semiconductor arrangement which is obtained in this manner.

FIGURE 1*e* is a schematic sectional view of a completed and separated assembly attached to an insulated plate.

FIGURE 1*f* is a plan view of the structure of FIGURE 1*e*.

Figures 4A, 4B:
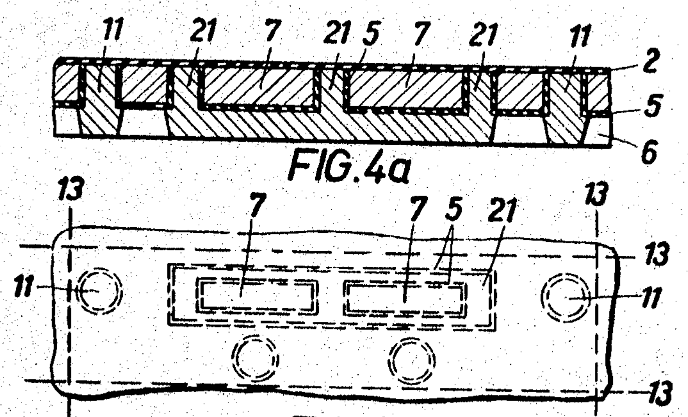

FIGURE 4*a* is a schematic sectional view of another embodiment of the invention.

FIGURE 4*b* is a plan view of the structure shown in FIGURE 4*a*.

Figure 5:
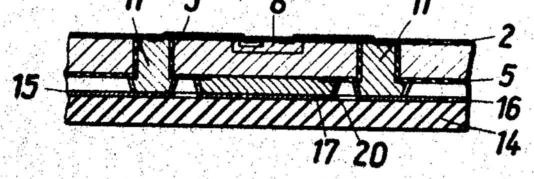

FIGURE 5 is a schematic sectional view of a further embodiment of the present invention.

Figure 1A:
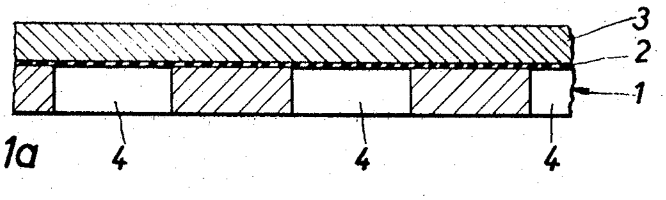

With more particular reference to the drawings, one method of construction in accordance with the present invention will be described making reference particularly to FIGURES 1*a* to 1*f*. A semiconductor body 1 including a low resistivity substrate and an epitaxial layer applied thereon is provided with an insulating layer 2, and this can be provided by thermal oxidation of the semiconductor body or by pyrolytic deposition of an insulating layer. Then, if desired, a carrier layer 3, which may be of a polycrystalline semiconductor material, is deposited onto insulating layer 2. Recesses 4 are etched into the semiconductor body and extend up to the insulating layer 2, and this can be accomplished, for example, with the aid of a selective etching agent. This is shown in FIGURE 1*a*.

Figure 1B:
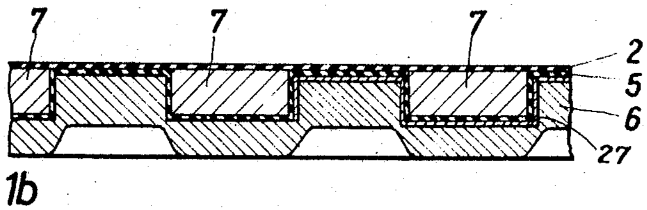

As shown in FIGURE 1*b*, subsequently the lower surface of the semiconductor arrangement is covered with an insulating layer 5, for example, by thermal oxidation of pyrolytic deposition, and then a polycrystalline semiconductor layer 6 preferably with a low resistivity in the range of $10^{-3}$ Ω/cm. is deposited in a suitable manner such as pyrolytically. The thickness of this layer is made to be equal to or greater than that of the semiconductor body 1. Then, if the carrier layer 3 had previously been applied it is now removed and this may be accomplished by a selective etching process. The removal is performed up to the insulating layer 2 so that the semiconductor arrangement shown in FIGURE 1*b* is produced.

Figure 1C:
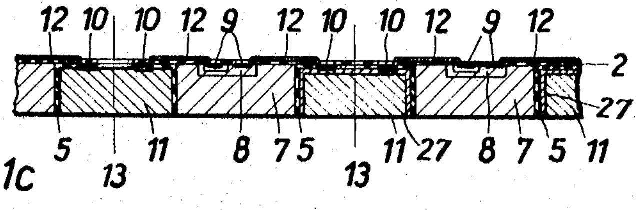
Figure 1D:
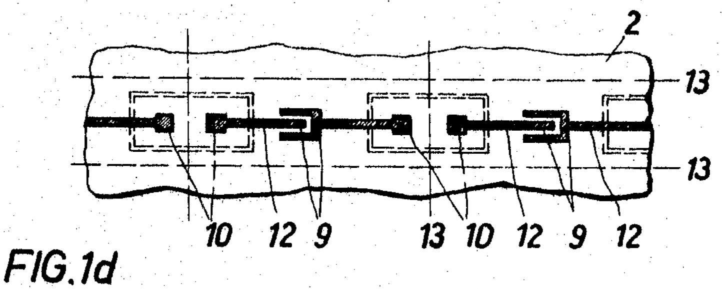

The lower surface of the semiconductor arrangement is then cleared and has material removed to such an extent that the semiconductor body 1 is once again exposed. Structural semiconductor elements or solid-state circuits, for example the transistors 8 shown in FIGURE 1*c* are produced in the monocrystalline semiconductor regions 7. Then, non-rectifying contacts 9 are provided at the transistors, for example, by breaking through the insulating layer 2 and alloying a metal producing a non-rectifying contact into the semiconductor material. Non-rectifying contacts 10 are also produced at the resulting separated and preferably low resistance zones 11. Any diffusion zones which may have possibly been produced at the lower surface of the arrangement during manufacture of the transistors 8 are removed, for example by lapping. However, in accordance with the present invention it is also possible to level and remove the polycrystalline layer 6 only after the manufacture of the active structural elements so that the above-mentioned diffusion zones are automatically removed therewith. Only after this are the contacts 9 of the transistors 8 and also the connections of the passive structural elements connected with the contacts 10 of the separated zones 11 by means of the conducting paths 12 which have been produced for example by the vacuum deposition of a metal or an alloy. The semiconductor arrangement is then subdivided into individual elements or solid-state circuits and this may be done by etching or breaking along the dashed lines 13. The dashed lines 13 extend through the separated zones 11.

Finally, the structural element or the solid-state circuit which is thus obtained in accordance with the present invention is soldered onto an insulating plate 14 which, for example, is made of ceramic material or glass and which comprises the contacting paths 15, 16 and 17 which have been applied thereto, and the housing connections 18. The conducting paths 15, 16 and 17 are so disposed on the insulating plate 14 of the housing that when the structural element is mounted onto the insulating plate the zones 11′ and 11″ connected with the transistor contacts

9 are connected with the conducting paths 15 and 16, and the collector zone of transistor 8 is connected with the large surface conducting path 17 in a single soldering operation. The conducting paths 15, 16 and 17 are conductively connected with the housing connections 18. A cross-sectional view of the resulting arrangement is shown in FIGURE 1*e* and a view of this structure is shown in FIGURE 1*f*.

In the event the resistance of the separated zones 11 between the upper and lower surfaces of the semiconductor arrangement is still too high—a resistivity of some $10^{-3}$ Ω/cm. for example results in a resistance of about 1Ω between upper and lower surface—and particularly when the semiconductor material of the polycrystalline layer 6 can not be made of sufficiently low resistivity, in accordance with the present invention it is possible to apply an additional metallic conductive layer 27 on the insulating layer 5 prior to the deposition of layer 6, as shown in the right parts of FIGURES 1*b* and 1*c*.

It is possible to provide as many connections or separated zones 11 as desired for each structural element or solid-state circuit. However, for contacting in the manner proposed by the present invention and as described on the basis of FIGURES 1*a* to 1*f*, it is a prerequisite that the separated zones 11 be positioned at the border of the semiconductor arrangement. In order to prevent the separated zones 11 from falling out during the subdivision of the semiconductor arrangement it is possible to provide these zones with a particular shape for example a wedge-like shape which is shown in FIGURE 2.

Figure 1E:
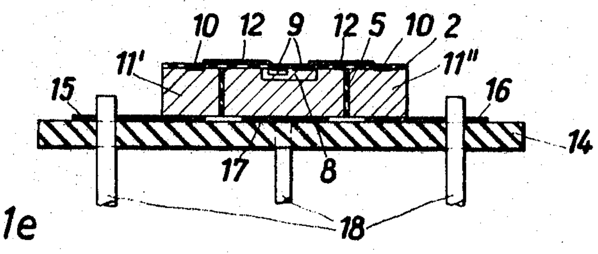
Figure 1F:
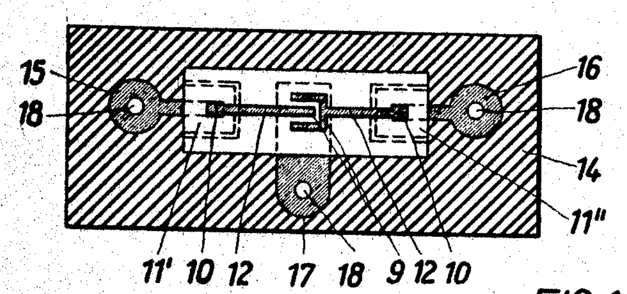
Figure 2:
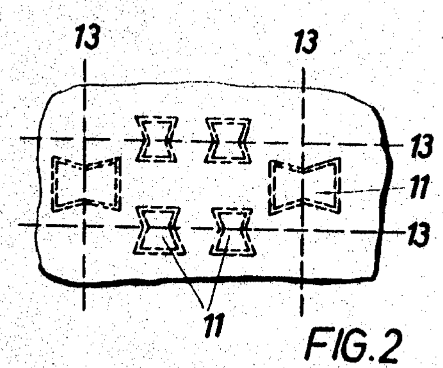
FIGURE 2 is a plan view showing the wedge-like shape which the separated low resistance semiconductor zones may have.
Figure 3:
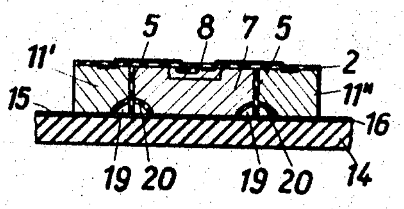
FIGURE 3 is a schematic sectional view showing a modified assembly which prevents short circuiting due to the connecting operation.

It is possible that the adjoining soldering surfaces can run together such as for examples 16 and 17, and 15 and 17 in FIGURES 1*e* and 1*f*. This can occur for example due to the creeping or flow of the eutectic mixture which is produced when the semiconductor arrangement is soldered onto the insulating plate. This flow of the eutectic mixture may occur along the bottom of the semiconductor arrangement. In order to prevent this creeping or flow of the eutectic mixture it is advisable to etch grooves 19 (see FIGURE 3) into the lower surface of the semiconductor arrangement between the soldering surfaces, for example by using a selective etching agent and a suitably arranged mask. In this event the insulating layer 5 will remain as a separating wall between zones 11 and 7. This separating effect may be increased by using another insulating layer 20 on the bottom of the arrangement which is subsequently removed outside of the grooves 19, for example by a lapping step. An arrangement produced in this manner is illustrated in FIGURE 3.

Another embodiment of the invention is shown in FIGURES 4*a* and 4*b*. Here, a semiconductor body is covered with an insulating layer and if desired with a carrier layer. Then recesses are provided in the bottom of the arrangement which are for the separated zones 11, and additionally a system of grooves is provided for producing separated monocrystalline semiconductor zones 7. Thereafter the lower surface of the arrangement is covered with the insulating layer 5 and the semiconductor layer 6. In this manner the separated zones 11 and the surrounding zones 21 are produced. The surrounding areas 21 enclose the separated monocrystalline semiconductor zones 7. If desired the deposited semiconductor layer 6 is made level and removed by selective etching up to the insulating layer 5 with the exception of the passages below the separated zones 7 and 11 and the surrounding areas 21. After removal of the carrier layer if such has been applied, the active elements are produced in the separated monocrystalline zones 7. Finally, the arrangement is again subdivided along the dash lines 13 and soldered to an insulating plate of a housing which is provided with conductive paths applied thereto. The separated zones 11 again represent the junctions between the connections of active and if desired passive structural elements and the coordiated conductive paths of the housing whereas the comparatively large surface soldering connection between the semiconductor area 21 and a corresponding metallized surface of the housing serves mainly for the purpose of heat dissipation.

The embodiment of FIGURES 4*a* and 4*b* differs from the embodiment of FIGURES 1*a* through 1*f* in that the separated zones 11 which serve as the connecting paths need not be positioned at the border of the semiconductor arrangement but may instead be disposed at any desired point thereof and thus also at the inside of the arrangement. The method related in connection with FIGURES 4*a* and 4*b* is particularly suitable for solid-state circuits with separated monocrystalline semiconductor zones.

A modified embodiment of the method described above will be explained in connection with FIGURE 5. This embodiment differs from that explained in connection with FIGURE 4*a* and 4*b* in that for the purpose of contacting the collector of a transistor 8 which has been produced in the monocrystalline zone, the insulating layer 5 is pierced prior to deposition of layer 6 and this is done within the area of the collector. Thus the layer 6 is provided with an opening through which the collector region of the monocrystalline zones can be contacted to the path 17 on the insulating plate by a part of layer 6. If desired the insulating layer 20 may be added in an analogous manner to the embodiment of FIGURE 3.

It will be understood that the above description of the present invention is susceptible to various modifications, changes, and adaptations, and the same are intended to be comprehended within the meaning and range of equivalents of the appended claims.

What is claimed is:

1. A method for the contacting of semiconductor elements and solid-state circuits, comprising, the steps of:
coating a semiconductor body with a first insulating layer;
providing the semiconductor body with semiconductor elements and separated zones extending from the upper to the lower surfaces of the semiconductor body;
providing nonrectifying contacts on the semiconductor elements and the separated zones;
applying conductive paths to the insulating layer which paths mutually interconnect the contacts of the semiconductor elements and the separated zones; and
soldering the semiconductor arrangement so formed with the surface opposite said conductive paths directly onto an insulating plate having conductive paths and connections in such manner that the separated zones and the semiconductor elements are at the same time conductively connected with the corresponding conducting paths and the connections of the insulating plate.

2. A method as defined in claim 1 wherein said separated zones are of low resistivity.

3. A method for the contacting of semiconductor elements and solid-state circuits, comprising, the steps of:
coating a monocrystalline semiconductor body with a first insulating layer;
providing the semiconductor body with semiconductor elements, and separated zones of low resistivity extending from the upper to the lower surfaces of the semiconductor body, said separated zones are produced by etching out recesses from the semiconductor body and substantially covering the side of the semiconductor arrangement comprising said recesses with a second insulating layer and then with a layer of polycrystalline low resistivity semiconductor material having a thickness at least equal to that of the semiconductor body, and thereafter removing the same up to the depth of the original semiconductor body;
providing nonrectifying contacts on the semiconductor elements and the separated zones;
applying conductive paths to the insulating layer which paths mutually interconnect the contacts of the semiconductor elements and the separated zones; and
soldering the semiconductor arrangement so formed onto an insulating plate of a housing having conductive paths and connections in such manner that the separated zones and the semiconductor elements are conductively connected with the conducting paths and the connections of the insulating plate.

4. A method as defined in claim 3 wherein a metal conductive layer is deposited on the second insulating layer before the semiconductor arrangement is covered with the polycrystalline semiconductor layer.

5. A method as defined in claim 3 comprising covering the upper surface of the semiconductor arrangement with a carrier layer after the application of the first insulating layer and removing the carrier layer after the application of the polycrystalline low resistivity layer.

6. A method as defined in claim 2 comprising removing from the arrangement any diffusion zones which may have been produced on a lower surface of the arrangement due to the provision of the semiconductor elements in the semiconductor body.

7. A method as defined in claim 2 wherein said conducting paths are produced by vacuum deposition of a metal or an alloy.

8. A method as defined in claim 2 comprising, after applying the conducting paths, subdividing the semiconductor arrangement into individual assemblies.

9. A method as defined in claim 8 wherein the separation into individual assemblies is accomplished by etching or breaking.

10. A method as defined in claim 9 wherein the separation occurs through the low resistivity zones.

11. A method as defined in claim 8 comprising soldering one of the assemblies so produced onto the insulating plate which includes large surface conducting paths.

12. A method for the contacting of semiconductor elements and solid-state circuits, comprising, the steps of:
coating a monocrystalline semiconductor body with a first insulating layer;
providing the semiconductor body with semiconductor elements, and separated zones of low resistivity extending from the upper to the lower surfaces of the semiconductor body;
providing nonrectifying contacts on the semiconductor elements and the separated zones;
applying conductive paths to the insulating layer which paths mutually interconnect the contacts of the semiconductor elements and the separated zones;
after applying the conducting paths, subdividing the semiconductor arrangement into individual assemblies;
soldering one of the assemblies so formed onto an insulating plate of a housing having conductive paths which includes large surface conductive paths and connections in such manner that the separated zones and the semiconductor elements are conductively connected with the conducting paths and the connections of the insulating plate; and
etching grooves into the lower surface of the semiconductor arrangement so that the grooves are positioned between the places where soldering is to be performed.

13. A method as defined in claim 12 comprising coating the lower surface of the semiconductor arrangement with a further insulating layer after the provision of said grooves, and subsequently removing the portion of the further insulating layer which is outside of said grooves.

14. A method for the contacting of semiconductor elements and solid-state circuits, comprising, the steps of:
coating a monocrystalline semiconductor body with a first insulating layer;
providing the semiconductor body with semiconductor elements, and separated zones of low resistivity and wedge-like cross-sectional shape extending from the upper to the lower surfaces of the semiconductor body;

providing nonrectifying contacts on the semiconductor elements and the separated zones;

applying conductive paths to the insulating layer which paths mutually interconnect the contacts of the semiconductor elements and the separated zones; and soldering the semiconductor arrangement so formed onto an insulating plate of a housing having conductive paths and connections in such manner that the separated zones and the semiconductor elements are conductively connected with the conducting paths and the connections of the insulating plate.

15. A method as defined in claim 3 wherein a system of grooves is provided in the semiconductor body for producing separate monocrystalline and polycrystalline semiconductor zones.

16. A method as defined in claim 15 comprising depositing onto the side of the semiconductor arrangement where the recesses and grooves are disposed, a layer of polycrystalline semiconductor material, leveling said deposited semiconductor layer, and thereafter removing the layer by selective etching up to the insulating layer which is embedded at the inside of the arrangement with the exception of passages disposed below the separated zones.

17. A method as defined in claim 16 wherein active semiconductor elements are provided in the separated monocrystalline semiconductor zones and the insulating layer enclosing the monocrystalline semiconductor zones is pierced below the active semiconductor elements prior to deposition of the layer of polycrystalline semiconductor material.

18. A method as defined in claim 17 comprising lining the lower surface of the resultant semiconductor arrangement with a further insulating layer.

References Cited

UNITED STATES PATENTS

| | | | |
|---|---|---|---|
| 3,258,898 | 7/1966 | Garibotti | 29—577 |
| 3,292,240 | 12/1966 | McNutt et al. | 29—577 |
| 3,300,832 | 1/1967 | Cave | 29—580 |
| 3,332,137 | 7/1967 | Kenney | 29—423 |
| 3,332,143 | 7/1967 | Gentry | 29—583 |
| 3,320,485 | 5/1967 | Buie. | |

OTHER REFERENCES

"Electronics Review," June 1964, p. 23.

"Electronic Equipment Engineering," December 1964, pp. 18, 19, 20.

JOHN F. CAMPBELL, Primary Examiner

PAUL M. COHEN, Assistant Examiner

U.S. Cl. X.R.

29—580, 589, 591; 317—101